(No Model.)

W. T. LEWIS.
BICYCLE BRAKE.

No. 486,935. Patented Nov. 29, 1892.

Witnesses.
A. Keithley.
A. T. Beck.

Inventor:
William T. Lewis.
By L. M. Thurlow
Atty.

UNITED STATES PATENT OFFICE.

WILLIAM T. LEWIS, OF PEORIA, ILLINOIS.

BICYCLE-BRAKE.

SPECIFICATION forming part of Letters Patent No. 486,935, dated November 29, 1892.

Application filed April 14, 1892. Serial No. 429,114. (No model.)

*To all whom it may concern:*

Be it known that I, WILLIAM T. LEWIS, a citizen of the United States, residing at Peoria, in the county of Peoria and State of Illinois, have invented certain new and useful Improvements in Brakes for Bicycles; and I do hereby declare the following to be a full, clear, and exact description of the invention, such as will enable others skilled in the art to which it appertains to make and use the same.

This invention relates to improvements in brakes for bicycles.

The object of the invention is to provide a brake in which a ball of suitable substance is journaled in a proper support, said ball bearing directly on the tire of the wheel and revolves by that pressure when the wheel is in motion, and the ball being many times smaller in diameter than the wheel a natural resistance is brought to bear on the momentum of the wheel and greater resistance is caused by the parts and means to be hereinafter set forth.

Figure 1:
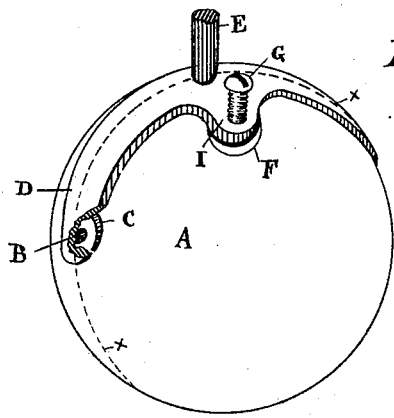
Figure 2:
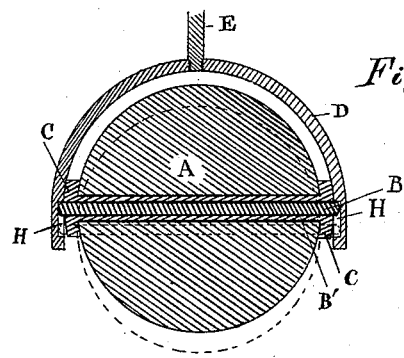
Figure 3:
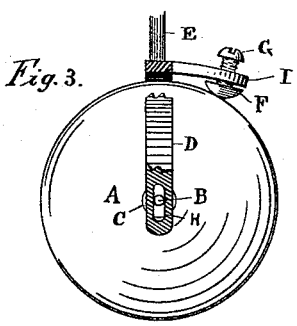
Figure 4:
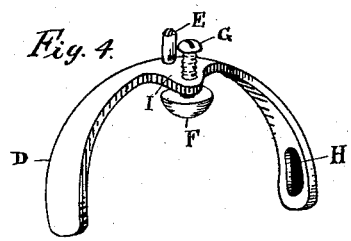

In the drawings hereto annexed, Figure 1 represents a perspective view of the brake, showing a part thereof broken away. Fig. 2 is a cross-section through dotted line X X, Fig. 1. Fig. 3 is a side view of the brake, showing its construction. Fig. 4 is a perspective view of a yoke, in which the ball is journaled.

A represents a ball of suitable material, preferably rubber, through which passes a shaft B, which may be placed within a tube B', running through the said ball, and on each end of this tube may be placed washers, or the ends thereof may be turned over to form the flanges C. The ends of the shaft B project a short distance beyond these flanged ends, as shown in Figs. 1 and 2. A metal yoke D, either in semicircular form or any other form desired, is shown in the several figures. The said yoke is provided near each of its extremities, on the inner side thereof, with an elongated slot or indenture H, which is cut into the metal about one-half or two-thirds of the thickness of the metal thereof, as shown, and leaving the outer surface of the yoke perfectly smooth. The shaft B is let into these slots H and may slip up and down freely therein. A projection or lip I is made integral with the yoke D at the highest point thereof, which is directly over the center of the ball, and through this lip passes a screw G, bearing on its lower extremity a button or nub F; also, behind the screw G is placed the brake-rod E ordinarily used, and which may be screwed therein—*i. e.,* into the metal yoke.

The operation of the device is as follows: When the brake hangs unused, the ball falls to its lowest position—that is, the shaft hangs in the bottom of the slot H, as shown in dotted lines, Fig. 2—and when the brake is brought into contact with the wheel-tire said ball immediately revolves, and as more pressure is imposed on the brake-rod the yoke and its parts are lowered into contact with the ball, and if the pressure is still brought to bear more firmly the pressure of the button F is necessarily more. Thus the greater the pressure on the brake the more resistance to the revolution of the ball, and hence a retarding of the momentum of the wheel. The screw G, with its button F, may be set at any desired position to attain greater or less friction when the brake is applied.

In my application for patent, Serial No. 405,828, filed by me September 16, 1891, allowed January 9, 1892, I have used some parts of the above-described invention; but in this invention I make a special point of the slots in the extremities of the yoke, and, therefore,

What I claim as new, and desire to secure by Letters Patent, is—

1. In a brake for bicycles, a yoke D, having an elongated slot H formed in either extremity thereof and parallel to the edges thereof, for the purposes herein set forth and described.

2. In a brake for bicyles, a semicircular or U-shaped yoke having an elongated slot cut in the inner side of each of the extremities thereof, for the purposes set forth and described, said yoke being mounted on the brake-rod of a velocipede and provided with a suitable braking device, substantially as and for the purposes herein set forth and described.

In testimony whereof I affix my signature in presence of two witnesses.

WILLIAM T. LEWIS.

Witnesses:
C. JOHNSON,
A. KEITHLEY.